(12) United States Patent
Yuan et al.

(10) Patent No.: US 12,510,289 B2
(45) Date of Patent: Dec. 30, 2025

(54) VOLATILIZATION DEVICE AND STORAGE DEVICE

(71) Applicants: HEFEI MIDEA REFRIGERATOR CO., LTD., Anhui (CN); HEFEI HUALING CO., LTD., Anhui (CN); MIDEA GROUP CO., LTD., Guangdong (CN)

(72) Inventors: Xiaolong Yuan, Anhui (CN); Xuezi Liu, Anhui (CN)

(73) Assignees: HEFEI MIDEA REFRIGERATOR CO., LTD., Hefei (CN); HEFEI HUALING CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 393 days.

(21) Appl. No.: 18/003,896

(22) PCT Filed: Dec. 23, 2020

(86) PCT No.: PCT/CN2020/138646
§ 371 (c)(1),
(2) Date: Dec. 29, 2022

(87) PCT Pub. No.: WO2022/110418
PCT Pub. Date: Jun. 2, 2022

(65) Prior Publication Data
US 2023/0280078 A1    Sep. 7, 2023

(30) Foreign Application Priority Data

Nov. 30, 2020 (CN) .......................... 202011383585.1

(51) Int. Cl.
*G01N 21/78* (2006.01)
*F25D 17/04* (2006.01)
*A61L 9/04* (2006.01)

(52) U.S. Cl.
CPC ......... *F25D 17/042* (2013.01); *G01N 21/783* (2013.01); *A61L 9/04* (2013.01);
(Continued)

(58) Field of Classification Search
CPC ............. F25D 17/042; F25D 2317/041; F25D 29/005; F25D 2500/06; G01N 21/783;
(Continued)

(56) References Cited

U.S. PATENT DOCUMENTS

| 4,681,739 A | 7/1987 | Rosenblatt et al. |
| 6,363,734 B1 | 4/2002 | Aoyagi |

(Continued)

FOREIGN PATENT DOCUMENTS

| CN | 1176939 A | 3/1998 |
| CN | 102657890 A | 9/2012 |

(Continued)

OTHER PUBLICATIONS

Machine translation of CN 113803948 (Year: 2021).*

*Primary Examiner* — David J Bolduc
(74) *Attorney, Agent, or Firm* — K&L Gates LLP (57) ABSTRACT

A volatilization device and a storage device. The volatilization device comprises: a shell having a cavity, an air outlet communicated with the cavity being formed on the shell; and a color change member fixed on the shell. One side of the color change member is exposed to the cavity, the other side of the color change member can be seen from the outer wall of the shell, and the color change member changes color according to the concentration of a target gas in the cavity. The storage device comprises a box and the volatilization device, and the shell is fixed in the box. The color change member is fixed on the shell, one side of the color change member is exposed to the cavity of the shell, the other side of the color change member can be seen from the (Continued)

outer wall of the shell, and a user thus can determine, by observing the color change of the color change member, the validity of an item to be stored in the cavity, helping the user in in-time replacing.

18 Claims, 6 Drawing Sheets

(52) U.S. Cl.
CPC ........ *A61L 2209/11* (2013.01); *A61L 2209/13* (2013.01); *A61L 2209/21* (2013.01); *F25D 2317/041* (2013.01)

(58) Field of Classification Search
CPC .... A61L 9/04; A61L 2209/11; A61L 2209/13; A61L 2209/21
See application file for complete search history.

(56) References Cited

U.S. PATENT DOCUMENTS

| | | | |
|---|---|---|---|
| 7,195,744 B2* | 3/2007 | Kilawee | A61L 2/20 422/305 |
| 8,517,483 B2 | 8/2013 | Eubanks et al. | |
| 9,435,746 B2* | 9/2016 | Tran-Thi | G01N 31/224 |
| 11,340,011 B2* | 5/2022 | Kelly | B01D 46/12 |
| 2003/0205051 A1 | 11/2003 | Kilawee et al. | |
| 2005/0235830 A1 | 10/2005 | Hughes | |
| 2006/0008919 A1 | 1/2006 | Boay et al. | |
| 2015/0050745 A1 | 2/2015 | Karato et al. | |
| 2018/0073989 A1* | 3/2018 | Lura | G01N 21/77 |
| 2018/0073991 A1* | 3/2018 | Lura | G01N 21/6428 |
| 2020/0056826 A1* | 2/2020 | Cizik | B01D 53/72 |

FOREIGN PATENT DOCUMENTS

| | | | |
|---|---|---|---|
| CN | 202485308 U | 10/2012 | |
| CN | 203455285 U | 2/2014 | |
| CN | 203858200 U | 10/2014 | |
| CN | 104641218 A | 5/2015 | |
| CN | 104643254 A | 5/2015 | |
| CN | 104664544 A | 6/2015 | |
| CN | 104664545 A | 6/2015 | |
| CN | 104777162 A | 7/2015 | |
| CN | 204575542 U | 8/2015 | |
| CN | 105911054 A | 8/2016 | |
| CN | 205619677 U | 10/2016 | |
| CN | 106969591 A | 7/2017 | |
| CN | 107076675 A | 8/2017 | |
| CN | 107179314 A | 9/2017 | |
| CN | 107782723 A | 3/2018 | |
| CN | 107796162 A | 3/2018 | |
| CN | 207763319 U | 8/2018 | |
| CN | 208124703 U | 11/2018 | |
| CN | 110145909 A | 8/2019 | |
| CN | 110243811 A | 9/2019 | |
| CN | 110624123 A | 12/2019 | |
| CN | 209825093 U | 12/2019 | |
| CN | 111480655 A | 8/2020 | |
| CN | 113803948 A * | 12/2021 | ............... A61L 2/20 |
| JP | H1151552 A | 2/1999 | |
| JP | H11211342 A | 8/1999 | |
| JP | 2000180034 A | 6/2000 | |
| JP | 2001021259 A | 1/2001 | |
| JP | 2005016875 A | 1/2005 | |
| WO | WO 2015074527 A1 | 5/2015 | |

* cited by examiner

VOLATILIZATION DEVICE AND STORAGE DEVICE

CROSS-REFERENCE TO RELATED APPLICATION

The present application claims priority to Chinese Application No. 202011383585.1, filed on Nov. 30, 2020, entitled "Volatilization Device and Storage Device", which is hereby incorporated by reference in its entity.

TECHNICAL FIELD

The present application relates to the technical field of food preservation, in particular to a volatilization device and a storage device.

BACKGROUND

A refrigerator will breed bacteria after a period of use, resulting in odor. In order to improve food safety and user experience, some refrigerators will be installed with sterilization boxes. A lid of the sterilization box has a plurality of vent holes, and the sterilization box is placed with a slow-release agent wrapped by a non-woven fabric, such as an adsorbed solid chlorine dioxide slow-release agent. Chlorine dioxide slow-release agent absorbs water in air through the vent holes, and then produces chlorine dioxide gas. Chlorine dioxide gas can kill viruses, bacteria, protozoa, algae, fungi and various spores and spore-forming bacteriophages, it also does not react with organic matter by chlorination, and does not produce mutagenic, carcinogenic and teratogenic substances or other toxic substances.

However, a speed of the chlorine dioxide slow-release agent releasing chlorine dioxide gas is related to a temperature and humidity of the surrounding environment. The higher the temperature or humidity of the surrounding environment, the more water the chlorine dioxide slow-release agent absorbs, and the faster the chlorine dioxide gas is released. However, with the passage of time, the ability of chlorine dioxide slow-release agent releasing chlorine dioxide gas will gradually weaken until it completely fails. Due to the vagaries of the temperature and humidity of the surrounding environment, the service life of chlorine dioxide slow-release agent is difficult to predict. In addition, the concentration of chlorine dioxide gas is not high under normal conditions, so it is difficult for users to determine whether the chlorine dioxide slow-release agent has failed by smelling it, resulting in users unable to replace it in time.

SUMMARY

An embodiment of the present application solves at least one of the problems existing in the related art.

One of the embodiments of the present application provides a volatilization device that can determine the validity of an object to be stored, so that users can replace it in time.

The volatilization device according to an embodiment of the present application includes:
- a housing, having a cavity, where the housing is formed with an air outlet communicated with the cavity; and
- a color-changing member, fixed to the housing, where a side of the color-changing member is exposed to the cavity, another side of the color-changing member is visible from an outer wall of the housing, and the color-changing member changes color according to a concentration of a target gas in the cavity.

The volatilization device according to an embodiment of the present application fixes the color-changing member on the housing, exposes a side of the color-changing member to the cavity of the housing, and makes another side of the color-changing member visible from an outer wall of the housing, and then users can determine a validity of an object to be stored in the cavity by observing a color-changing member of the color-changing member, which facilitates users to change the in time.

In an embodiment, an observation window communicated with the cavity is provided on the housing, and the color-changing member is embedded in the observation window.

In an embodiment, the observation window is further embedded with a transparent plate, and the transparent plate is buckled on a side of the color-changing member distal to the cavity.

In an embodiment, the color-changing member is embedded in the air outlet, and a projection area of the color-changing member on the air outlet is smaller than an area of the air outlet.

In an embodiment, the color-changing member is gelatin, and the target gas is chlorine dioxide gas.

In an embodiment, the volatilization device further includes: a first annular rib, provided in the cavity to divide the cavity into an accommodation cavity and an annular cavity distributed inside and outside, where the accommodation cavity is provided on an inner side of the annular cavity, the first annular rib is provided with a first vent hole for communicating the accommodation cavity with the annular cavity, and the first vent hole is staggered with the air outlet.

In an embodiment, the volatilization device further includes: a partition plate, provided in the annular cavity to divide the annular cavity into two buffer cavities distributed in front and back, where the partition plate is provided with a second vent hole for communicating the two buffer cavities; and
- the accommodation cavity is communicated with one of the two buffer cavities through the first vent hole, and another of the two buffer cavities is communicated with the air outlet.

In an embodiment, the first vent hole is a notch formed at a first side edge of the first annular rib, and the air outlet is provided near a second side edge of the first annular rib provided opposite to the first side edge of the first annular rib.

In an embodiment, an inner wall of the housing facing the notch is formed with a baffle plate opposite to the notch, and the baffle plate is located in the accommodation cavity, a free end of the baffle plate extends toward the second side edge of the first annular rib, an extension length of the baffle plate is not less than a height of the notch, and a gap is provided between a side wall of the baffle plate facing the first annular rib and the first annular rib.

In an embodiment, the housing includes:
- a back cover, where a side of the back cover is an opening; and
- a front cover, detachably covered on the opening to form the cavity surrounded by the front cover and the back cover, where one side edge of the first annular rib is fixed to the back cover, and another side edge of the first annular rib extends to the front cover.

In an embodiment, the air outlet is formed on a side wall of the back cover and is located at an edge of the back cover distal to the front cover, and the color-changing member is fixed on the front cover and/or the air outlet.

In an embodiment, a side of the front cover facing the back cover is formed with a second annular rib, the second annular rib extends into the annular cavity, and the second annular rib closes to a side wall of the back cover.

In an embodiment, a side wall of the annular cavity is formed with a plurality of wedge-shaped protrusions, a side of the front cover facing the back cover is formed with a plurality of first clamping hooks corresponding to the wedge-shaped protrusions in one-to-one correspondence on a, and the first clamping hook clamps with the corresponding wedge-shaped protrusion.

In an embodiment, a side of the front cover facing the back cover is formed with a plurality of clamping buckles, a placement space of an object to be stored is formed between the plurality of clamping buckles, and a free end of the clamping buckle bends toward a center of the front cover.

The embodiments of the present application further provide a storage device, including a box body and the volatilization device mentioned above, where the housing is fixed in the box body.

BRIEF DESCRIPTION OF DRAWINGS

To more clearly illustrate the embodiments of the present application or related art, accompanying drawings used in the description of the embodiments or the prior art are briefly introduced below. It should be noted that, the drawings in the following description only show some embodiments of the present application. For those of ordinary skill in the art, other drawings may also be obtained according to these drawings without creative effort.

REFERENCE NUMERALS

100: housing; 101: accommodation cavity; 102: first buffer cavity; 103: second buffer cavity; 200: front cover; 210: baffle plate; 211: gap; 220: second annular rib; 230: first clamping hook; 240: clamping buckle; 250: third annular rib; 260: force applying member; 300: back cover; 301: air outlet; 310: first annular rib; 311: notch; 320: partition plate; 321: second vent hole; 322: first clamping hole; 330: wedge-shaped protrusion; 340: second clamping hook; 400: box body; 401: second clamping hole; 410: drawer; 500: chlorine dioxide slow-release agent; 610: first magnetic member; 620: second magnetic member; 700 transparent plate; 800: color-changing member.

DETAILED DESCRIPTION OF THE EMBODIMENTS

In order to more clearly illustrate the technical advantages, solutions, and other advantages of the present application, the embodiments of the present application are further described in detail below in combination with the accompanying drawings and implementation. It should be noted, without confliction, the embodiments or the features of the embodiments can be combined with each other.

In the description of the present application, it is to be noted that, the orientation or positional relations specified by terms such as "central", "longitudinal", "transverse", "upper", "lower", "front", "back", "left", "right", "vertical", "horizontal", "top", "bottom", "inner", "outer" and the like, are based on the orientation or positional relations shown in the drawings, which is merely for convenience of description of the present application and to simplify description, but does not indicate or imply that the stated devices or components must have the particular orientation and be constructed and operated in a particular orientation, and thus it is not to be construed as limiting the present application. Furthermore, the terms "first", "second", "third" and the like are only used for descriptive purposes and should not be construed as indicating or implying a relative importance.

In the description of the present application, it is to be noted that unless explicitly specified and defined otherwise, the terms "connected to" and "connected" shall be understood broadly, for example, it may be either fixedly connected or detachably connected, or can be integrated; it may be either mechanically connected, or electrically connected; it may be either directly connected, or indirectly connected through an intermediate medium. The specific meanings of the terms above in the present application can be understood by a person skilled in the art in accordance with specific conditions.

As shown in FIG. 1 to FIG. 4, a volatilization device of an embodiment includes a housing 100 and a color-changing member 800. The housing 100 has a cavity for accommodating an object to be stored, and the housing 100 is formed with an air outlet 301 communicated with the cavity. The color-changing member 800 is fixed on the housing 100, where a side of the color-changing member 800 is exposed to the cavity, and another side of the color-changing member 800 visible from an outer wall of the housing 100, that is, the color-changing member 800 can be observed from an outer side of the housing 100. The color-changing member 800 changes color according to a concentration of a target gas (that is, a gas released by an object to be stored) in the cavity. The object to be stored can be, but is not limited to, a solid fungicide or a solid aromatic agent.

By taking an object to be stored being chlorine dioxide slow-release agent 500 and a color-changing member 800 being gelatin as an example, the working principle of the volatilization device in an embodiment of the present application when applied to a refrigerator is described as follows.

Gelatin is the product of partial hydrolysis of collagen, and is a hydrophilic colloid of macromolecules. Gelatin is colorless to light yellow solid, and odorless, tasteless and shiny. Gelatin is insoluble in water, but when soaked in water, it can absorb 5 to 10 times of the water, and then is expanded and softened. After the gelatin absorbing yellowish green to orange chlorine dioxide gas, gelatin color will become yellowish green to orange.

When being used, the housing 100 placed with chlorine dioxide slow-release agent 500 is put into the refrigerator, and water vapor in the refrigerator will enter the cavity through the air outlet 301. The chlorine dioxide slow-release agent 500 stored in the cavity releases chlorine dioxide gas after absorbing the water vapor. Since a side of the color-changing member 800 (that is, the gelatin) is exposed to the cavity, the gelatin can directly contact with the chlorine dioxide gas in the cavity. The color of the gelatin gradually changes from colorless to light yellow to yellowish green to orange after absorbing the chlorine dioxide gas. In addition, the chlorine dioxide gas in the cavity continuously flows into the refrigerator through the air outlet 301. With the passage of time, the ability of chlorine dioxide slow-release agent 500 to release chlorine dioxide gas gradually weakens. After the chlorine dioxide slow-release agent 500 fails, the chlorine dioxide slow-release agent 500 will not release chlorine dioxide gas. The chlorine dioxide gas adsorbed by gelatin is released, and the color of gelatin changes from yellow green to orange yellow to light yellow to colorless. Since another side of the gelatin can be seen from an outer wall of the housing 100, the user does not need to open the housing 100, and the color changing of the gelatin can be observed directly from the outer side of the housing 100. When the user observes that the color of gelatin is yellowish green to orange yellow, it indicates that the chlorine dioxide slow-release agent 500 is still effective; and when the user observes that the color of the gelatin is restored to light yellow to colorless, it indicates that the chlorine dioxide slow-release agent 500 has failed, so that the user can replace the chlorine dioxide slow-release agent 500 or the entire volatilization device in time.

In order to make a side the color-changing member 800 being exposed to the cavity and another side of the color-changing member 800 being visible from the outer wall of the housing 100, the installation position and modes of the color-changing member 800 are various. The following modes will be given as examples.

Figure 8:
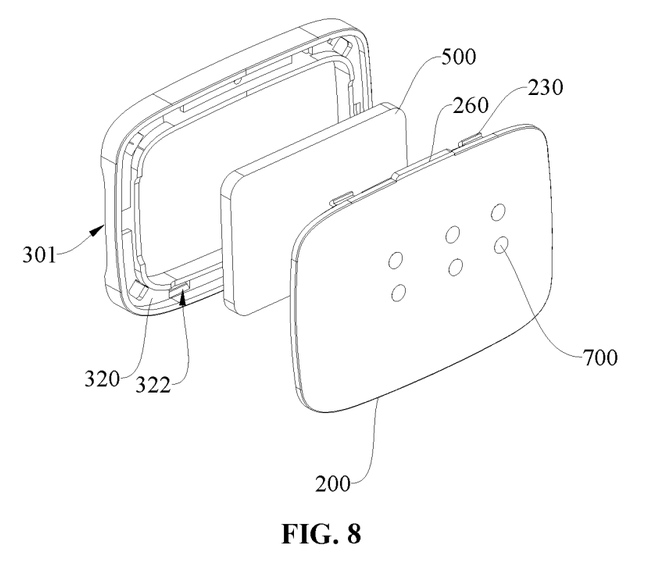
FIG. 8 is a third exploded view of a volatilization device provided by the present application.
Figure 9:
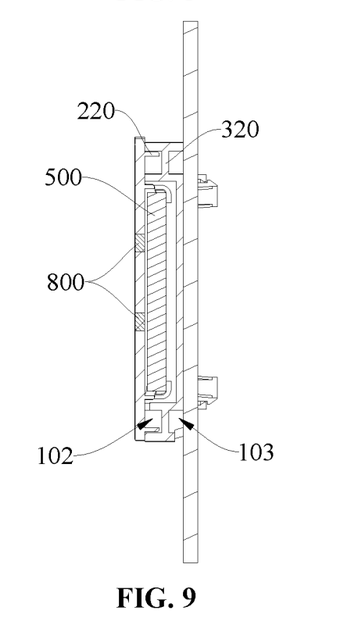
FIG. 9 is a first longitudinal exploded view of a volatilization device provided by the present application.

Mode one: one side of the color-changing member 800 is directly exposed to the cavity. As shown in FIG. 3, FIG. 4, FIG. 6 and FIG. 7, an observation window communicated with the cavity is provided on the housing 100, and the color-changing member 800 is embedded in the observation window. In this mode, one side of the color-changing member 800 is exposed to the cavity, and another side of the color-changing member 800 is exposed to the external environment. In order to avoid the color-changing member 800 from being damaged, the observation window is further embedded with a transparent plate 700, and the transparent plate 700 is buckled on a side of the color-changing member 800 distal to the cavity. In order to improve the accuracy, as shown in FIG. 8 and FIG. 9, there can be provided with a plurality of observation windows.

Mode two: one side of the color-changing member 800 is indirectly exposed to the cavity. Since the air outlet 301 is communicated with the cavity, the color-changing member 800 can be embedded in the air outlet 301, and a projection area of the color-changing member 800 on the air outlet 301 is smaller than an area of the air outlet 301, that is, the color-changing member 800 does not block the air outlet 301 completely. For example, when the air outlet 301 is rectangular, the color-changing member 800 can be a rectangular structure, which has the same width as the air outlet 301 and has a length being less than the length of the air outlet 301.

For another example, when the air outlet 301 is round or oval, the color-changing member 800 can be an annular structure.

Mode three: the color-changing member 800 is directly exposed to the cavity as a whole. In an embodiment, the housing 100 is made of transparent material such as transparent plastic, and the color-changing member 800 is directly fixed on the inner wall of the housing 100.

Figure 2:
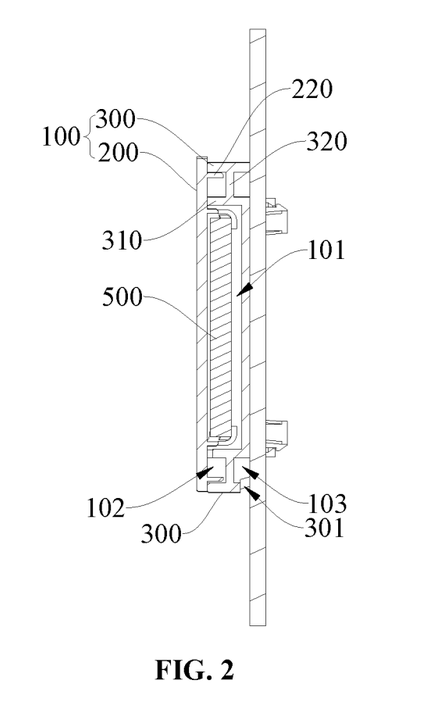
FIG. 2 is a sectional view of FIG. 1 at A-A.

In the following, the object to be stored being chlorine dioxide slow-release agent 500 is still taken as an example. Considering that the temperature in the refrigerator is much lower than the temperature of the external environment, the air with higher external temperature will condense into water vapor after entering the refrigerator during the taking and releasing of the food, which will make the chlorine dioxide slow-release agent 500 absorb too much water vapor and continuously produce a large amount of chlorine dioxide gas. This will not only greatly shorten the actual service life of the chlorine dioxide slow-release agent 500, but also affect the user experience and even corrode an inner wall of the refrigerator. In order to slow down the gas exchanging speed of the chlorine dioxide slow-release agent 500 and the outside, as shown in FIG. 2, the cavity of the housing 100 is provided with a first annular rib 310, and the first annular rib 310 divides the cavity into an accommodation cavity 101 and an annular cavity distributed inside and outside, and the accommodation cavity 101 is provided on an inner side of the annular cavity. The first annular rib 310 is provided with a first vent hole for communicating the accommodation cavity 101 with the annular cavity, and the first vent hole is staggered with the air outlet 301. Since the air outlet 301 of the housing 100 is staggered with the first vent hole of the first annular rib 310, whether the external gas flows from the air outlet 301 to the accommodation cavity 101, or the chlorine dioxide gas released by the chlorine dioxide slow-release agent 500 in the accommodation cavity 101 flows from the accommodation cavity 101 to the air outlet 301, the above flow paths will not be straight lines, and the gas needs to change a flow direction for a plurality of times, thereby slowing down the gas exchanging speed of the chlorine dioxide slow-release agent 500 in the accommodation cavity 101 with the outside, and prolonging the service life of the chlorine dioxide slow-release agent 500.

From the above, it should be noted that the chlorine dioxide gas will pass through the accommodation cavity 101, the annular cavity and the air outlet 301 during the whole process, so the color-changing member 800 can be exposed to any one of the accommodation cavity 101, the annular cavity and the air outlet 301.

Figure 11:
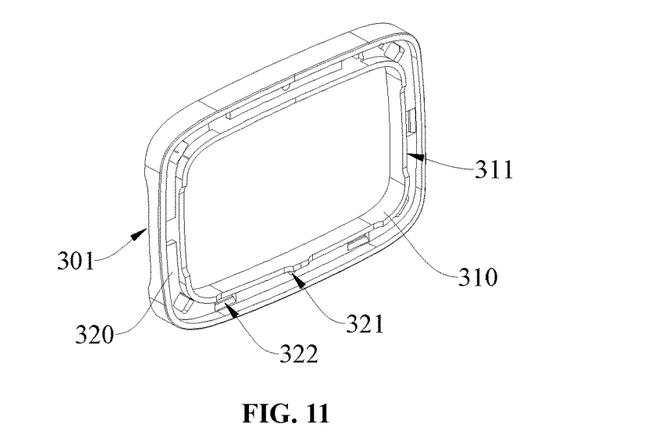
FIG. 11 a first perspective view of a back cover provided by the present application.
Figure 12:
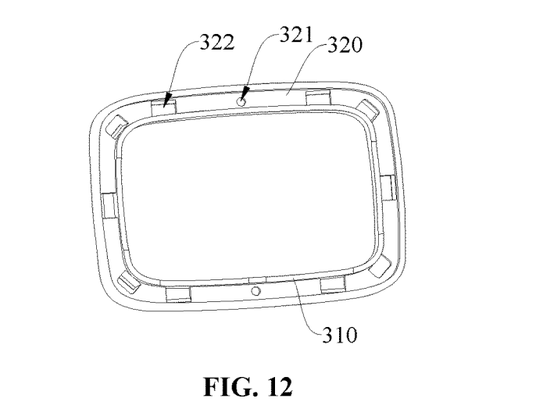
FIG. 12 a second perspective view of a back cover provided by the present application.

In an embodiment, as shown in FIG. 2, FIG. 11 and FIG. 12, in order to reduce the flow speed of gas in the annular cavity, the annular cavity is provided with a partition plate 320, and the partition plate 320 divides the annular cavity into two buffer cavities distributed in front and back. The partition plate 320 is provided with a second vent hole 321 for communicating two buffer cavities; the accommodation cavity 101 is communicated with one of the two buffer cavities through the first vent hole, and another buffer cavity is communicated with the air outlet 301.

In order to facilitate description, the buffer cavity located on the front side in FIG. 2 is named as the first buffer cavity 102, and the buffer cavity located on the back side is named as the second buffer cavity 103. It is assumed that the accommodation cavity 101 is communicated with the first buffer cavity 102 through the first vent hole, and the second buffer cavity 103 is communicated with the air outlet 301. After the housing 100 being put into the refrigerator, the water vapor in the refrigerator will enter the second buffer cavity 103 through the air outlet 301. Since the second buffer cavity 103 is communicated with the first buffer cavity 102 through the second vent hole 321, the water vapor entering the second buffer cavity 103 will flow into the first buffer cavity 102 through the second vent hole 321 from back to front, and then enter the accommodation cavity 101 through the first vent hole. The chlorine dioxide slow-release agent 500 in the accommodation cavity 101 will produce chlorine dioxide gas after absorbing the water vapor entering the accommodation cavity 101. When the chlorine dioxide gas in the accommodation cavity 101 reaches a certain amount, the chlorine dioxide gas will enter the first buffer cavity 102 through the first vent hole. After the chlorine dioxide gas in the first buffer cavity 102 accumulates to a certain amount, it will flow through the second vent hole 321 into the second buffer cavity 103 from front to back, and finally discharge from the housing 100 through the air outlet 301 and release into the refrigerator. It should be noted that whether the water vapor in the refrigerator flows from the air outlet 301 to the accommodation cavity 101, or the chlorine dioxide gas produced by the chlorine dioxide slow-release agent 500 flows from the accommodation cavity 101 to the air outlet 301, the two flow paths are non-linear, and the gas needs to change the flow direction for a plurality of times. Moreover, the speed of the gas flowing between the first buffer cavity 102 and the second buffer cavity 103 is significantly reduced by the blocking of the partition plate 320.

It should be noted that the cavity 101 can also be directly communicated with the second buffer cavity 103 through the first vent hole in addition to being directly communicated with the first buffer cavity 102 through the first vent hole. In this case, the air outlet 301 is communicated with the first buffer cavity 102. The external gas enters the first buffer cavity 102 through the air outlet 301, and the external gas accumulated in the first buffer cavity 102 flows into the second buffer cavity 103 from front to back through the second vent hole 321, and then enters the accommodation cavity 101 through the first vent hole. Since the gas generated by the object to be stored in the accommodation cavity 101 flows from the accommodation cavity 101 to the air outlet 301 in the opposite way, it will not be described here.

Figure 4:
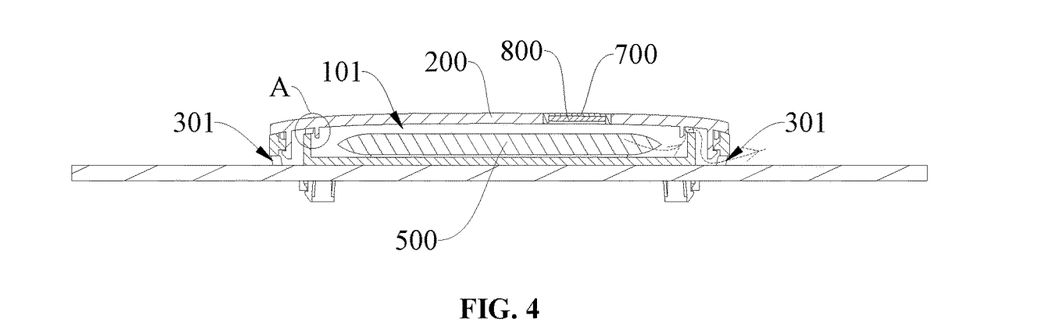
FIG. 4 is a transverse section view of volatilization device provided by the present application.
Figure 5:
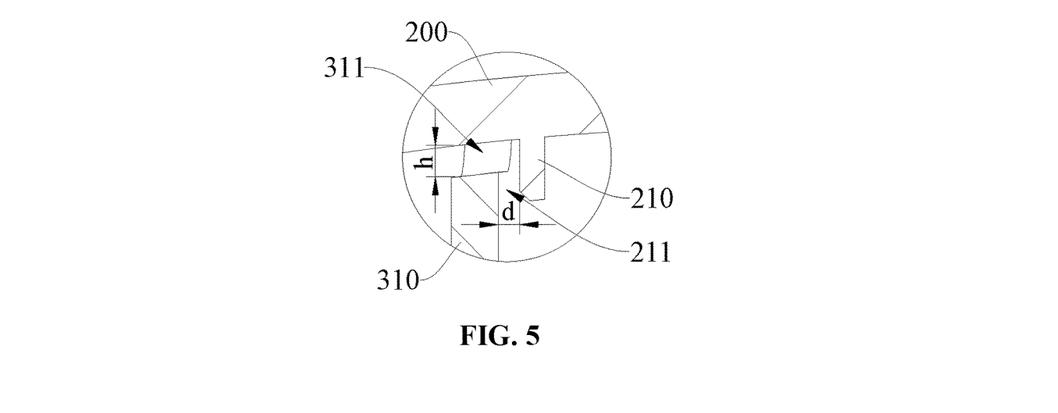
FIG. 5 is an enlarged view of FIG. 4 at A.

As shown in FIG. 4 and FIG. 5, the first vent hole is a notch 311 formed at a first side edge of the first annular rib 310, the air outlet 301 is provided near a second side edge of the first annular rib 310, and the first side edge and the second side edge of the first annular rib 310 are provided opposite to each other. The advantage of this arrangement is that the front-back distance between the notch 311 and the air outlet 301 can be maximized, thereby prolonging the flow time of the gas in the two buffer cavities. In addition, in order to further slow down the speed of gas passing through the notch 311, the inner wall of the housing 100 facing the notch 311 is formed with a baffle plate 210 opposite to the notch 311, and the baffle plate 210 is located in the accommodation cavity 101. A free end of the baffle plate 210 extends towards the second side edge of the first annular rib 310. An extension length of the baffle plate 210 is not less than a height of the notch 311. There is a gap 211 between a side wall of the baffle plate 210 facing the first annular rib 310 and the first annular rib 310.

Taking the chlorine dioxide slow-release agent 500 as an example still, the buffer cavity on a front side in FIG. 2 is named as the first buffer cavity 102, and the buffer cavity on a back side is named as the second buffer cavity 103. The notch 311 is formed on a front edge of the first annular rib 310, and the first buffer cavity 102 is communicated with the accommodation cavity 101 through the notch 311. One end of the baffle plate 210 is fixed on a front surface of the housing 100, and another end of the baffle plate 210 extends backward. The air outlet 301 is formed on the outer wall of the housing 100 and is close to a back edge of the second annular rib 220. Bing blocked by the baffle plate 210, after the chlorine dioxide gas produced by the chlorine dioxide slow-release agent 500 in the accommodation cavity 101 reaches a certain amount, the chlorine dioxide gas must first bypass the baffle plate 210 and pass through the gap 211 between the baffle plate 210 and the first annular rib 310 to reach the notch 311, and then flow into the first buffer cavity 102. When the chlorine dioxide gas in the first buffer cavity 102 accumulates to a certain amount, it will flow through the second vent hole 321 into the second buffer cavity 103 from front to back, and finally discharge from the housing 100 through the air outlet 301. The path of the gas in the external environment to the cavity 101 through the air outlet is opposite to the above direction, and will not be described here. It should be noted that whether the gas in the external environment flows from the air outlet 301 to the accommodation cavity 101, or the gas generated by the object to be stored in the accommodation cavity 101 flows to the air outlet 301, the gas needs to bypass at least two bends, and needs to change the flow direction for a plurality of times, which significantly slows down the speed of gas exchange between the object to be stored in the accommodation cavity 101 and the outside, thereby prolonging the service life of the object to be stored.

Figure 7:
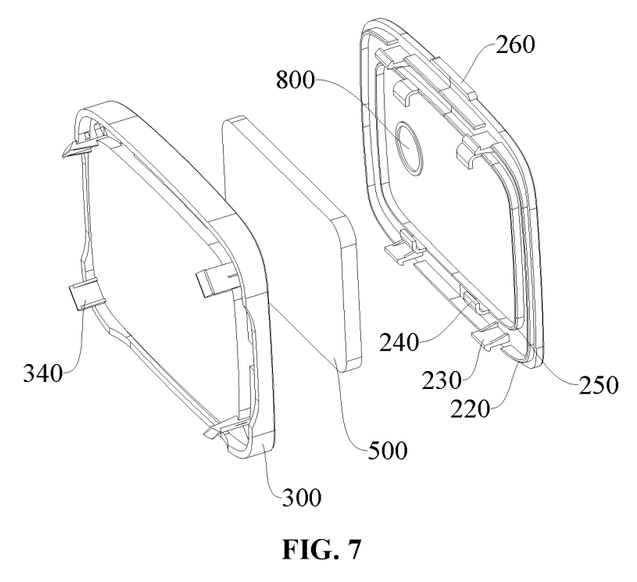
FIG. 7 is a second exploded view of a volatilization device provided by the present application.

In addition, as shown in FIG. 4 and FIG. 7, the first side edge of the first annular rib 310 can be provided with a plurality of notches 311, and in this case, the baffle plate 210 can be an annular plate to facilitate processing. In addition, in order to prevent baffle plate 210 from affecting the storage of the object to be stored in the housing 101, the extended length of the baffle plate 210 is equal to or slightly greater than the height of the notch 311. In order to better control the gas flow speed, as shown in FIG. 5, the height h of the gap 311 can be, but not limited to, 0.3 mm~1.5 mm, and the width d of the gap 211 can be, but not limited to, 0.3 mm~1 mm.

Figure 14:
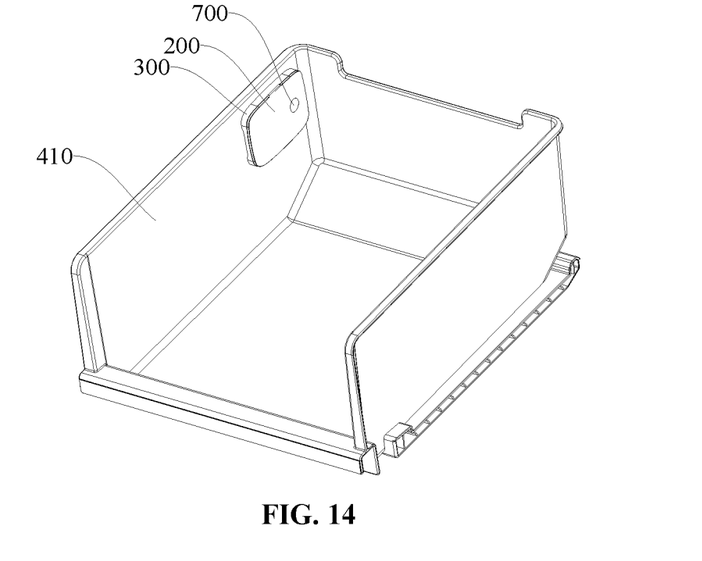
FIG. 14 is a structural diagram of a drawer (installed with a volatilization device) provided by the present application.

In addition, considering the housing 100 being installed in a vertical direction generally, taking the refrigerator as an example, as shown in FIG. 14, the housing 100 is usually fixed on a side wall of a drawer 410 of the refrigerator. In order to prevent condensations on the food material from directly falling into the air outlet 301 of the housing 100, based on the orientation in FIG. 3, the air outlet 301 can be provided on a left wall, a right wall and/or a bottom surface of the housing 100. That is, in addition to a top surface of the housing 100, the air outlet 301 can be provided at anywhere else in the housing 100.

Figure 6:
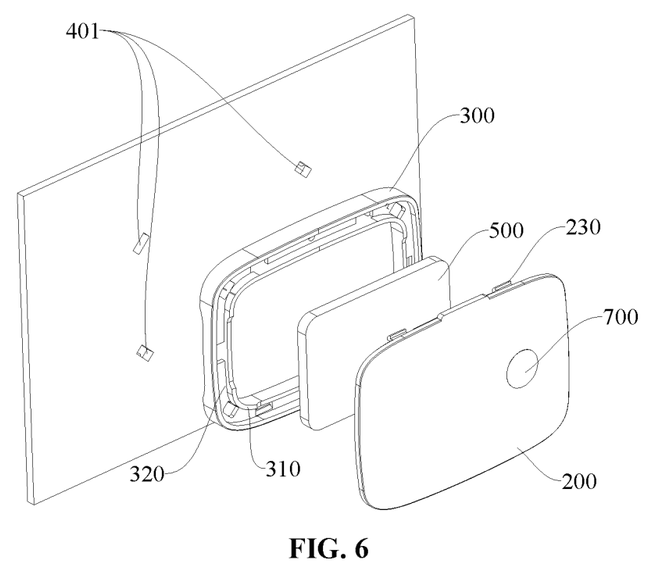
FIG. 6 is a first exploded view of a volatilization device provided by the present application.

As shown in FIG. 6, the housing 100 includes a front cover 200 and a back cover 300. One side of the back cover 300 is an opening, the front cover 200 is detachably covered on the opening, and a cavity is formed by being surrounded by the front cover 200 and the back cover 300. One side edge of the first annular rib 310 is fixed on the back cover 300, and another side edge of the first annular rib 310 extends to the front cover 200. Therefore, as shown in FIG. 2, after the front cover 200 covered on the opening of the back cover 300, and an end surface of the opening of the back cover 300 and an end surface of the first annular rib 310 extending to the front cover 200 close to an inner wall of the front cover 200. Two seals can be formed between the front cover 200 and the back cover 300, so that the external gas can be prevented from entering the cavity 101 through a seam between the front cover 200 and the back cover 300. As shown in FIG. 6, the first annular rib 310 and the partition plate 320 can be integrated with the back cover 300 in the case of a partition plate 320 being provided in the annular cavity. In order to facilitate the formation of the partition plate 320, an opposite side of the opening on the back cover 300 has an annular opening provided relative to the partition plate 320, that is, a side of the second buffer cavity 103 back to the first buffer cavity 102 in FIG. 2 is the opening.

It should be noted that there are many modes to realize the detachable connection between the front cover 200 and the back cover 300.

Figure 3:
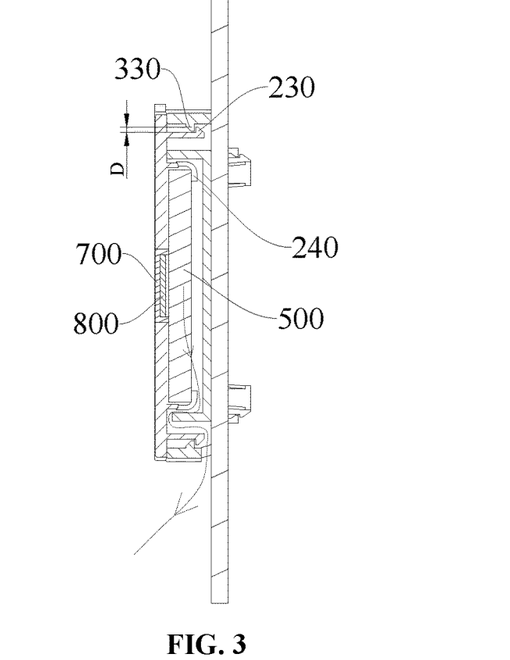
FIG. 3 is a sectional view of FIG. 1 at B-B.
Figure 10:
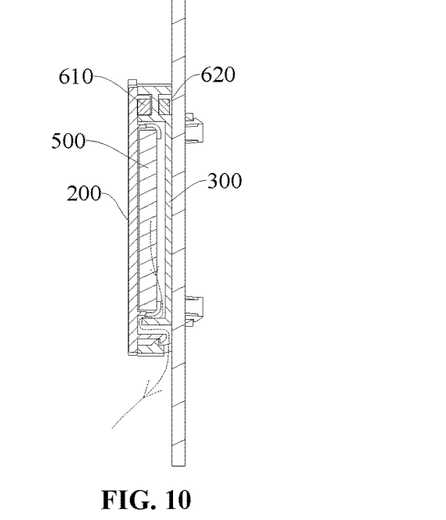
FIG. 10 is a second longitudinal exploded view of a volatilization device provided by the present application.
Figure 13:
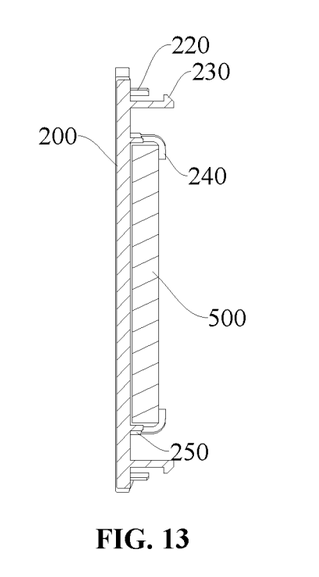
FIG. 13 is a longitudinal exploded view of a front cover provided by the present application.

Mode one: clamping connection. As shown in FIG. 3, FIG. 7 and FIG. 13, a side wall of the annular cavity is formed with a plurality of wedge-shaped protrusions 330 A side of the front cover facing the back cover is formed with a plurality of first clamping hooks 230 corresponding to the wedge-shaped protrusions 330 in one-to-one correspondence. The first clamping hook 230 clamps with the corresponding wedge-shaped protrusion 330. As shown in FIG. 3, the first clamping hook 230 includes a supporting arm and a hook portion. One end of the supporting arm is fixed to the front cover 200, and a side wall of another end of the supporting arm is provided with a hook portion. The supporting arm and the hook portion can be integrally formed. As shown in FIG. 10, in order to ensure the smooth clamping of the first clamping hook 230 and the wedge-shaped protrusion 330, the range of a height D the hook portion protruding from the supporting arm can be 0.5 mm~1 mm. In addition, as shown in FIG. 3 and FIG. 8, in the case of the partition plate 320 being provided in the annular cavity, in order to ensure that the first clamping hook 230 and the wedge-shaped protrusion 330 have sufficient clamping space, the wedge-shaped protrusion 330 can be provided on a side wall of the buffer cavity distal to the front cover 200, and then the partition plate 320 is provided with the first clamping hole 322 corresponding to the wedge-shaped protrusion 330. When the volatilization device is used, the object to be stored, such as chlorine dioxide slow-release agent 500, is first placed in the accommodation cavity 101; a side of the front cover 200 provided with the first clamping hook 230 faces the opening of the back cover 300, and the first clamping hook 230 passes through the first clamping hole 322 and is inserted into the buffer cavity provided with the wedge-shaped protrusion 330 (that is, the second buffer cavity 103); finally, it is only necessary to press the front cover 200 backwards, the hook portion of the first clamping hook 230 slides to the back of the wedge-shaped protrusion 330 along a wedge surface corresponding to the wedge-shaped protrusion 330 driving by this pressing force, and then the front cover 200 can be fixed to the opening of the back cover 300.

Similarly, in order to facilitate the fixation of the volatilization device, as shown in FIG. 7, a side of the back cover 300 back to the front cover 200 is formed with a plurality of second clamping hooks 340. Taking the refrigerator drawer 410 as an example, as shown in FIG. 6, the side wall of the refrigerator drawer 410 can be pre-injected into the second clamping hole 401 corresponding to the second clamping hook 340 in one-to-one correspondence, and a side wall of the second clamping hole 401 can also be provided with a wedge-shaped protrusion for matching with the second clamping hook 340.

Mode two: magnetic attraction. As shown in FIG. 10, the front cover 200 is provided with a first magnetic member 610, and the back cover 300 is provided with a second magnetic member 620 engaging with the first magnetic member 610. It should be noted that the side of the front cover 200 towards the back cover 300 can be provided with a plurality of first magnetic members 610. In this case, the annular cavity is provided with a second magnetic member 620 corresponding to the first magnetic member 610 in one-to-one correspondence. In order to ensure the airtightness between the front cover 200 and the back cover 300, there is at least four first magnetic members 610. The four first magnetic members 610 are distributed in four corners of the front cover 200, and the second magnetic member 620 is distributed in four corners of the annular cavity. The first magnetic member 610 can be, but not limited to, an iron sheet, and the second magnetic member 620 can be, but not limit to, a magnet. It should be noted that the positions of the first magnetic member 610 and the second magnetic member 620 are not limited by the attached figures, and the first magnetic member 610 and the second magnetic member 620 described here are components that can react to a magnetic field, that is, components that can be attracted or repelled by the magnetic field, such as magnets or components made of magnetic materials.

Similarly, in order to facilitate the fixation of the volatilization device, the side of the back cover 300 back to the front cover 200 can be fixed with a third magnetic member, and a fourth magnetic member can be fixed on the side wall of the refrigerator drawer 410. The third magnetic member is configured to engage with the fourth magnetic member.

Figure 1:
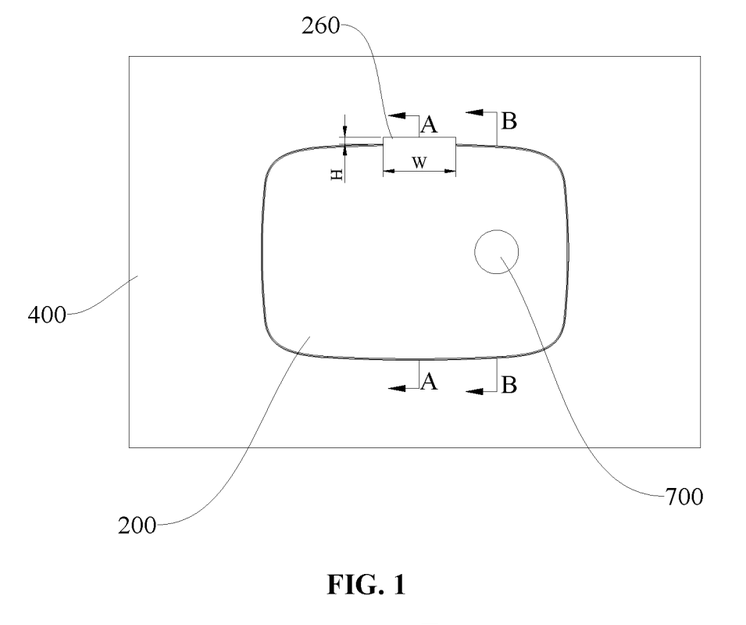
FIG. 1 is a front view of a volatilization device provided by the present application.

For mode one and mode two, as shown in FIG. 1 and FIG. 7, in order to facilitate the removal of the front cover 200 from the back cover 300, an edge of the front cover 200 is formed with a force applying member 260, and the force applying member 260 is pushed out of the back cover 300. When the front cover 200 needs to be removed, the user only need to hold the force applying member 260 and pull the front cover 200 backward, that is, in a direction distal to the back cover 300. The force applying member 260 can be provided in a side edge of the front cover 200, to facilitate the user to apply concentrated force on one side. As shown in FIG. 1, the height H of the force applying member 260 protruding out off the back cover 300 is not less than 1 mm, and the width W of the force applying member 260 is not less than 10 mm.

Mode three: thread connection. In an embodiment, the edge of the front cover 200 bends backwards to form a flanging. An inner wall of the flanging has internal threads, and an outer wall of the back cover 300 has external threads matching with the internal threads. When installing the front cover 200, it is only necessary to buckle the front cover 200 behind the opening of the back cover 300, and then screw the front cover 200.

Mode four: screw connection. The end surface of the opening of the back cover 300 has a plurality of threaded holes, and the front cover 200 is provided with a through hole corresponding to the threaded holes. When installing the front cover 200, the front cover 200 is first buckled on the back cover 300, the through hole of the front cover 200 is aligned with the corresponding thread hole, and then a screw is screwed into the corresponding thread hole after passing through the through hole.

In addition, as shown in FIG. 2, in order to further prevent the external gas from entering the accommodation cavity 101 through the seam between the front cover 200 and the back cover 300, the side of the front cover 200 facing the back cover 300 is formed with a second annular rib 220, the second annular rib 220 extends into the annular cavity, and the second annular rib 220 closes to a side wall of the back cover 300. Therefore, even if the external gas flows into the seam between the end surfaces of the front cover 200 and the back cover 300, since the second annular rib 220 closes to the side wall of the back cover 300, it is blocked by the second annular rib 220, and these external gases cannot enter the annular cavity, and then cannot enter the accommodation cavity 101.

As shown in FIG. 8, the air outlet 301 is formed on the side wall of the back cover 300, and the air outlet 301 is located on an edge of the back cover 300 distal to the front cover 200, to avoid food materials put into the refrigerator from blocking the air outlet 301. The color-changing member 800 can be fixed to the front cover 200 and/or the air outlet 301. As shown in FIG. 6 to FIG. 8, a left wall, a right wall and a bottom surface of the back cover 300 are provided with air outlets 301. The advantage of this arrangement is that it cannot only prevent condensations on the food materials from directly falling into the air outlet 301, but also meet the requirements of the accommodation cavity 101 exchanging gas with the outside.

In addition, as shown in FIG. 7 and FIG. 13, in order to facilitate the replacement and fixation of the object to be stored, the side of the front cover 200 facing the back cover 300 is formed with a plurality of clamping buckles 240, and a placement space for the object to be stored is formed between the plurality of the clamping buckles 240. A free end of the clamping buckle 240 bends towards a center of the front cover 200 to hold the object to be stored. When it is necessary to replace the object to be stored, such as the chlorine dioxide slow-release agent 500, the user can first remove the front cover 200 from the back cover 300, and then remove the chlorine dioxide slow-release agent 500 that is previously fixed between the plurality of clamping buckles 240, and then the new chlorine dioxide slow-release agent 500 is placed between the plurality of clamping buckle 240, and an edge of the new chlorine dioxide slow-release agent 500 is held under the free end of the clamping buckles 240, and finally the front cover 200 and the object to be stored are installed on the back cover 300 together. During the whole replacement process, the user only needs to remove the front cover 200 without removing the entire volatilization device.

As shown in FIG. 13, in order to facilitate the installation and positioning of the object to be stored, a third annular rib 250 is provided on the side of the front cover 200 towards the back cover 300, and a plurality of clamping buckles 240 are fixed on the third annular rib 250 and provided along a circumferential direction of the third annular rib 250 at intervals. In addition, in order to increase the holding force applied to the object to be stored by the clamping buckle 240, a fixed end of the clamping buckle 240 and the third annular rib 250 can be rotatably connected by a rotating shaft, which is sleeved with a torsion spring. When it is necessary to place object to be stored, the user can first pull up the clamping buckle 240, that is, the clamping buckle 240 is rotated along a direction distal to the inner wall of the front cover 200; then the object to be stored is placed in an area surrounded by the third annular rib 250; finally, the clamping buckle 240 is released. The clamping buckle 240 is driven by the torsion spring to rotate towards the inner wall of the front cover 200 until the object to be stored are compressed. The third annular rib 250 and the baffle plate 210 can be a same component.

In addition, the embodiment of the present application further provides a storage device, which includes a box body 400 and the volatilization device mentioned above, where the housing 100 is fixed in the box body 400. The box body 400 can be, but not limited to, a refrigerator, a retail cabinet, a display cabinet or a wardrobe. For example, when the box body 400 is a refrigerator, the housing 100 can be fixed on an inner wall of a tank or an inner wall of a door body of the refrigerator, or on a side wall of a bottle frame or a drawer 410 of the refrigerator.

By adopting the volatilization device mentioned above, the storage device in the embodiments can not only meet the requirements of sterilization and deodorization in the box body 400, but also can intuitively determine the effectiveness of the object to be stored by observing the color-changing member of the color-changing member 800, to facilitate the user to change it in time.

The above embodiments are only used to illustrate the embodiments of the present application, rather than limiting them. Although the present application has been described in detail with reference to the above embodiments, those of ordinary skill in the art should understand that the various combinations, modifications or equivalent replacements of the solutions of the present application are not apart from the scope of the solutions of the present application, and should be covered in the scope of the claims of the present application.

What is claimed is:

1. A volatilization device, comprising:
    a housing having a cavity and an air outlet in communication with the cavity;
    a color-changing member fixed to the housing, wherein a side of the color-changing member is exposed to the cavity, another side of the color-changing member is visible from an outer wall of the housing, and the color-changing member configured to change color according to a concentration of a target gas in the cavity; and
    a first annular rib, provided in the cavity and dividing the cavity into an accommodation cavity and an annular cavity arranged inside and outside of the first annular rib, respectively, wherein the accommodation cavity is provided on an inner side of the annular cavity, wherein the first annular rib is provided with a first vent hole in communication with the accommodation cavity and the annular cavity, and the first vent hole is staggered with the air outlet.

2. The volatilization device according to claim 1, wherein the housing includes an observation window in communication with the cavity, and the color-changing member is embedded in the observation window.

3. The volatilization device according to claim 2, wherein the observation window includes an embedded transparent plate, and the transparent plate is buckled on a side of the color-changing member distal to the cavity.

4. The volatilization device according to claim 1, wherein the color-changing member is embedded in the air outlet, and a projection area of the color-changing member on the air outlet is smaller than an area of the air outlet.

5. The volatilization device according to claim 1, wherein the color-changing member is gelatin, and the target gas is chlorine dioxide gas.

6. The volatilization device according to claim 1, further comprising:
    a partition plate, provided in the annular cavity and dividing the annular cavity into two buffer cavities arranged in front and back side of partition plate, respectively, wherein the partition plate is provided with a second vent hole in communication with each of the two buffer cavities; and the accommodation cavity is communicated with one of the two buffer cavities through the first vent hole, and another of the two buffer cavities is in communication with the air outlet.

7. The volatilization device according to claim 1, wherein the first vent hole is a notch formed at a first side edge of the first annular rib, and the air outlet is provided near a second side edge of the first annular rib opposite to the first side edge of the first annular rib.

8. The volatilization device according to claim 7, wherein an inner wall of the housing facing the notch includes a baffle plate opposite to the notch, and the baffle plate is located in the accommodation cavity, a free end of the baffle plate extends toward the second side edge of the first annular rib, an extension length of the baffle plate is equal to or greater than a height of the notch, and a gap is provided between a side wall of the baffle plate facing the first annular rib and the first annular rib.

9. The volatilization device according to claim 1, wherein the housing comprises:
   a back cover, wherein a side of the back cover is an opening; and
   a front cover, detachably covered at the opening to form the cavity surrounded by the front cover and the back cover, wherein one side edge of the first annular rib is fixed to the back cover, and another side edge of the first annular rib extends to the front cover.

10. The volatilization device according to claim 9, wherein the air outlet is formed on a side wall of the back cover and is located at an edge of the back cover distal to the front cover, and the color-changing member is fixed on one or more of the front cover or the air outlet.

11. The volatilization device according to claim 9, comprising a second annular rib on a side of the front cover facing the back cover, wherein the second annular rib extends into the annular cavity, and the second annular rib is in contact with a side wall of the back cover.

12. The volatilization device according to claim 9, comprising a plurality of wedge-shaped protrusions on a side wall of the annular cavity, and a plurality of first clamping hooks on a side of the front cover facing the back cover, the plurality of first clamping hooks corresponding to the plurality of wedge-shaped protrusions in one-to-one correspondence, and each first clamping hook clamping with a corresponding wedge-shaped protrusion.

13. The volatilization device according to claim 9, comprising a plurality of clamping buckles on a side of the front cover facing the back cover, a placement space of an object to be stored is formed among the plurality of clamping buckles, and a free end of a clamping buckle of the plurality of clamping buckles bends toward a center of the front cover.

14. A storage device, comprising a box body and a volatilization device, wherein the housing is fixed in the box body, and wherein the volatilization device includes:
   a housing having a cavity and an air outlet in communication with the cavity;
   a color-changing member fixed to the housing, wherein a side of the color-changing member is exposed to the cavity, another side of the color-changing member is visible from an outer wall of the housing, and the color-changing member configured to change color according to a concentration of a target gas in the cavity; and
   a first annular rib, provided in the cavity and dividing the cavity into an accommodation cavity and an annular cavity arranged inside and outside of the first annular rib, respectively, wherein the accommodation cavity is provided on an inner side of the annular cavity, wherein the first annular rib is provided with a first vent hole in communication with the accommodation cavity and the annular cavity, and the first vent hole is staggered with the air outlet.

15. The storage device according to claim 14, wherein the housing includes an observation window in communication with the cavity, and the color-changing member is embedded in the observation window.

16. The storage device according to claim 15, wherein the observation window includes an embedded transparent plate, and the transparent plate is buckled on a side of the color-changing member distal to the cavity.

17. The storage device according to claim 14, wherein the color-changing member is embedded in the air outlet, and a projection area of the color-changing member on the air outlet is smaller than an area of the air outlet.

18. The storage device according to claim 14, wherein the color-changing member is gelatin, and the target gas is chlorine dioxide gas.

* * * * *